Dec. 2, 1969  H. R. LINDESMITH ET AL  3,481,026
METHOD OF JOINING A LADDER RUNG TO A SIDE RAIL
Original Filed Oct. 19, 1967  4 Sheets-Sheet 1

INVENTORS
HAROLD R. LINDESMITH
RICHARD P. SULECKI
CHARLES R. TUCK
BY
J. H. SLOUGH
ATTORNEY

Dec. 2, 1969  H. R. LINDESMITH ET AL  3,481,026

METHOD OF JOINING A LADDER RUNG TO A SIDE RAIL

Original Filed Oct. 19, 1967  4 Sheets-Sheet 4

INVENTORS
HAROLD R. LINDESMITH
RICHARD P. SULECKI
CHARLES R. TUCK
BY
J. H. SLOUGH
ATTORNEY

United States Patent Office 3,481,026
Patented Dec. 2, 1969

3,481,026
METHOD OF JOINING A LADDER RUNG TO A SIDE RAIL
Harold R. Lindesmith, Greenville, Richard P. Sulecki, Transfer, and Charles R. Tuck, Greenville, Pa., assignors to R. D. Werner Co., Inc., Greenville, Pa., a corporation of Pennsylvania
Original application Oct. 19, 1967, Ser. No. 681,045. Divided and this application Nov. 18, 1968, Ser. No. 776,434
Int. Cl. B21d 39/00; B23p 11/00
U.S. Cl. 29—516
3 Claims

ABSTRACT OF THE DISCLOSURE

There is disclosed herein a rung-to-rail ladder joint construction and method therefor comprising providing the end portion of a rung with a loosely fitting sleeve, projecting the sleeve and end portion through a pierced side rail, and collapsing the sleeve in an axial direction to cause the sleeve to fold outwardly to form annular nodes or flanges on either side of the rail.

---

This application is a divisional of application for U.S. Letters Patent Ser. No. 681,045, filed Oct. 19, 1967, for "Ladder Constructions."

This invention relates to ladder constructions and is more particularly concerned with a means and method of joining ladder rungs to side rails where such parts are made of metal such as aluminum and its alloys or fiberglass and other plastics.

The invention particularly relates to improvements over U.S. Letters Patent No. 3,039,186 dated June 19, 1962, and assigned to the assignee of the present application.

In the prior art construction, the end portion of a tubular rung was provided with a ferrule blank in the form of a tubular sleeve of malleable metal, the inner diameter of the sleeve being slightly smaller than the outer diameter of the rung to provide an interference fit between the parts. The web of a channel shaped side rail was pierced whereby the rung end portion with the sleeve fitted thereon could be projected through the rail, the sleeve then being swaged endwise by suitable die means whereby the sleeve was formed into a ferrule having radially extending flange portions gripping either side of the web around the periphery of the rail aperture. In preparation for mounting the sleeve to the rung, said sleeve was generally tumbled to remove burrs, and the end of the rung was chamfered to facilitate starting the rung end portion into the sleeve. In the course of the swaging operation, the sleeve reacted like a short column under compression and buckled to form a single annular bulge or node. Radial inward flow of the metal was limited by the rung, and the major flow of metal was radially outwardly against the edge of the rail aperture which split the metal and caused it to flow over the flat surface portions of the web surrounding the aperture. The result was an extreme compression tension fit between the ferrule and side rail web producing a joint having great strength and structural integrity.

The present invention relates to a rung-to-rail joint or connection wherein the side rail is of thinner gage material or of plastic or fiberglass reinforced plastic material which, though perfectly suitable for ladder construction, does not withstand the radial pressure exerted at the rail aperture as well as heavier gage metals and is, therefore, subject to fracturing or bending in this area. It also relates to constructions using, for example, fiber glass reinforced rungs which do not withstand the reactive radially inward force of the swaged ferrule as well as metal rungs.

In general, the difference between the prior construction referred to and the present invention resides in providing a loose fit rather than an interference fit between the sleeve or ferrule blank, and buckling the blank to form annular nodes at either side of the rail rather than in the plane of said web thereby minimizing radial pressure at the periphery of the rail aperture and increasing the flange area radially overlapping the flat surface portions surrounding the rail aperture. The loose fit of the sleeve or blank eliminates the need for tumbling the blank and also eliminates the operation of chamfering the end of the rung.

In view of the foregoing, it is an object of this invention to provide a ladder rung-to-rail joint or connection especially adapted for use where the side rails of the ladder are of thin gage material or are made of plastic or fiberglass reinforced plastic material.

Another object is to provide a ladder rung joint or connection as set forth above wherein a ferrule is swaged onto a rung end portion and into engagement with outer surface portions surrounding a rail aperture with minimal radial force being exerted against the edge of the aperture.

Still another object of the invention is to provide a rung connection of the type set forth above wherein the ferrule is provided with double annular nodes disposed on either side of the side rail web in compression therewith.

A further object is to provide a rung connection having the above features and characteristics wherein a loose-fitting, sleevelike ferrule blank is crimped to the end portion of a rung and formed by endwise compression to provide the aforesaid annular nodes or flanges on either side of the rail web.

Yet another object is to provide a method of making a rung connection of the type set forth above.

Other objects of the invention and the invention itself will be understood from the following description thereof and the accompanying drawings, in which said drawings.

Figure 1:
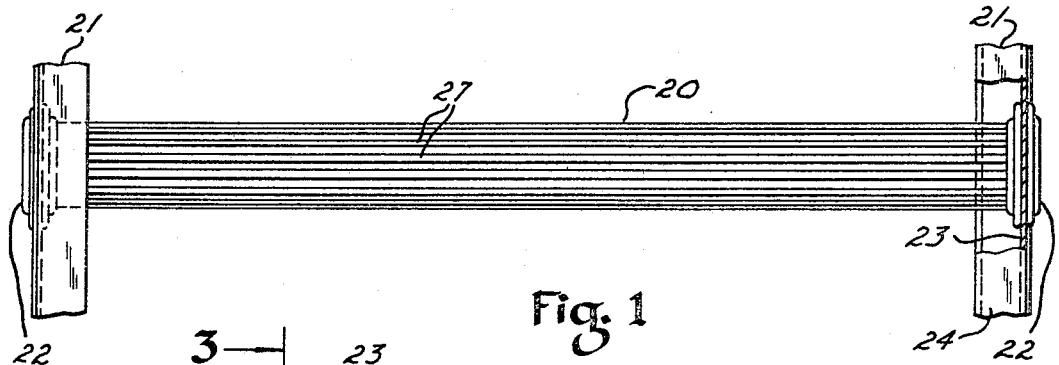
FIGURE 1 is a front elevation of a ladder rung and portions of the side rails to which the rung is attached, one side rail being in partial section to show a rung-to-rail connection according to the present invention.

Referring now to the drawings in all of which like parts are designated by like reference numerals, FIGURE 1 shows a horizontal rung 20 connected at the ends thereof to a pair of channel shaped side rails 21 by means of ferrules 22. The means of connection are identical with respect to both ends of the rung 20, and only one end thereof will be herein described in detail.

Referring now particularly to FIGURES 2–5, each side rail 21 comprises a wall or web 23 and parallel, laterally projecting flanges 24. The web 23 is suitably apertured at 25 whereby it is adapted to receive an end portion of the rung 20 and the ferrule 22 associated therewith. Said aperture in the first form of the invention is preferably circular in shape whereby it is adapted to receive a circular rung and ferrule, but it will be readily understood that said rung may be of any cross sectional shape such as rectangular, elliptical, etc. Said aperture may be provided with radially projecting notches or pips 26, and the rung 20 is preferably provided with longitudinally directed, radially projecting ribs 27.

Figure 3:
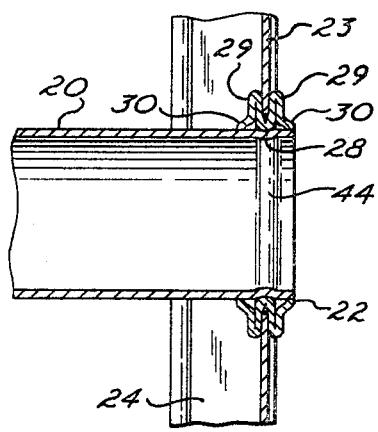
FIGURE 3 is a vertical section taken along the line 3—3 of FIGURE 2.
Figure 4:
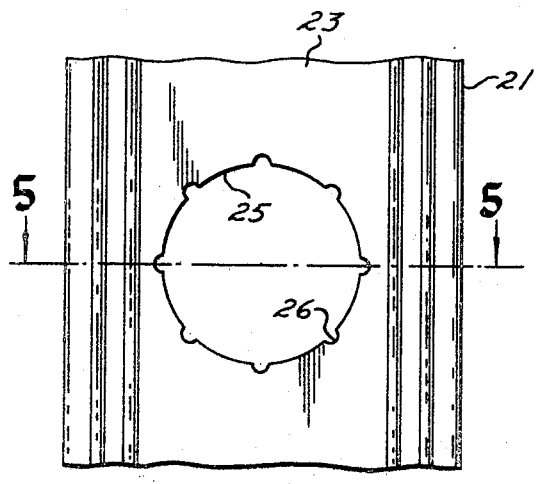
FIGURE 4 is a view similar to FIGURE 2, the rung and connection means being removed to disclose the aperture in the side rail web.
Figure 5:
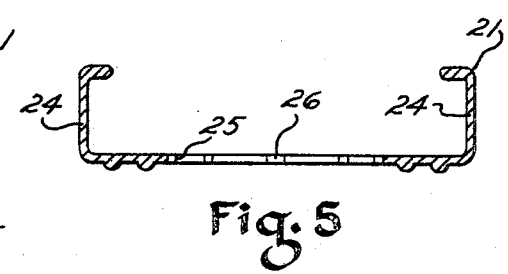
FIGURE 5 is a horizontal section taken along the line 5—5 of FIGURE 4.

As shown in FIGURE 3, the ferrule 22 has a central portion 28 disposed in the plane of the web 23 within the aperture 25. On either side of the central portion 28 are radially outwardly folded annular flanges or nodes 29 which are formed tightly against the inner and outer surfaces of said web 23. Axially extending flanges 30 project endwise from the inner portions of the flanges or nodes 29 and are crimped inwardly tightly against the outer surface of the rung 20. In this manner the rung 20 is firmly and rigidly connected to the web 23 of the side rail 21 by the ferrule 22.

Figure 6:
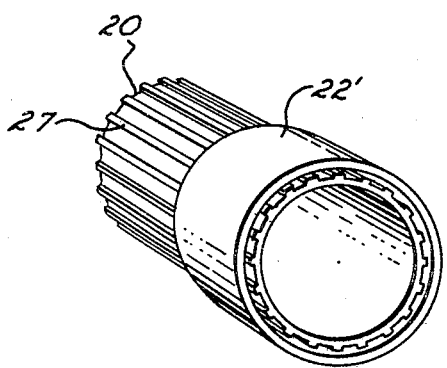
FIGURE 6 is a perspective view of an end portion of the rung having a cylindrical ferrule blank telescoped thereover.
Figure 7:
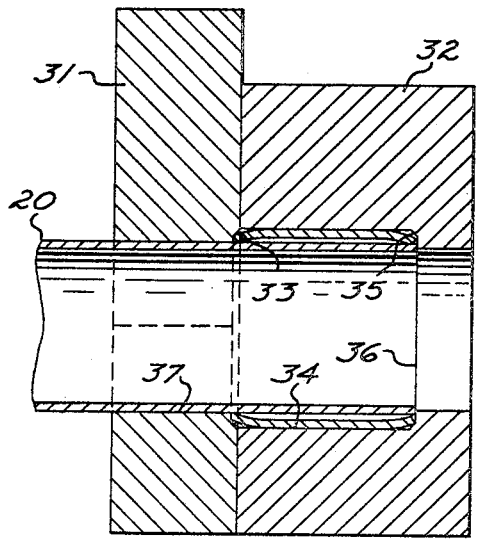
FIGURE 7 is a vertical section through the rung end portion and ferrule showing the ferrule blank being crimped onto the rung by a pair of dies.

FIGURES 6–9 illustrate the method by which the ferrule 22 is formed into the completed connection means illustrated in FIGURE 3. As shown in FIGURE 6, the end portion of the rung 20 is first provided with a plane, cylindrical ferrule blank 22' which is disposed loosely over said end portion. The ends of said ferrule blank 22' are then crimped radially inwardly into tight engagement with the rung 20 by a pair of die members 31 and 32. The die member 31 has an annular beveled seat 33 adapted to form one end of the ferrule blank 22' radially inwardly. The die member 32 has a coacting annular cavity 34 adapted to telescope over said ferrule blank and suuround the beveled seat or surface 33. The inner end of the annular cavity 34 which is disposed opposite the beveled seat 33 is provided with a similar beveled seat 35 and a transverse shoulder 36. The end portion of the rung 20 projects through an opening 37 in the die member 31 with a portion thereof projecting beyond said die member and carrying the ferrule blank 22'. When the die members 31 and 32 are brought together, the distal end of the rung 20 seats against the shoulder 36 and the annular beveled seats or surfaces 33 and 35 crimp the ends of said ferrule blank inwardly tightly against the rung 20.

Figure 8:
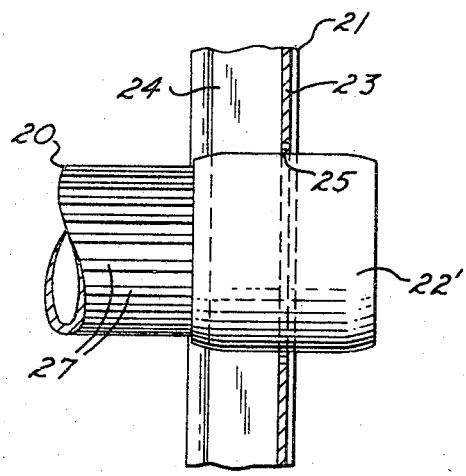
FIGURE 8 shows the rung end portion with the ferrule crimped thereon positioned through the aperture in the side rail web.
Figure 9:
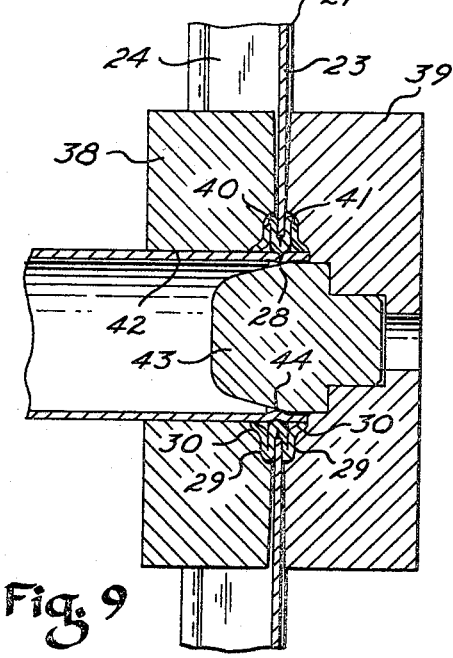
FIGURE 9 is a vertical section through the rung end portion showing a pair of dies in closed position forming the ferrule blank into its final shape for connecting the rung to the side rail.

FIGURE 8 shows the manner in which the rung 20 with the crimped ferrule blank 22' disposed thereon is projected through the aperture 25 in the side rail web 23 to a position wherein substantially equal portions of said ferrule blank project laterally on either side of said web. The final forming step is effected by cooperating die members 38 and 39 having like, annular cavities 40 and 41, respectively, for forming the finished ferrule as illustrated in FIGURE 3. The die member 39 is disposed beyond the end of the rung 20, said rung projecting through a suitable opening 42 in the die member 38, which said die member is preferably provided in two parts having semicircular openings which define the opening 42 when the die member is closed. The die member 39 carries a tapered pilot member 43 which projects inwardly of the open end of the rung 20 and affords an inner anvil radially inwardly of the ferrule 22.

As the die members 38 and 39 move axially toward each other, the ferrule blank 22' buckles radially outwardly in two distinct flanges or nodes, one on each side of the web portion surrounding the aperture 25. This buckling creates a double layered flange on either side of the web of substantial radial dimension, and the malleable material of the flange blank is molded and pressed tightly against said web and into the notches or pips 26. Some inward pressure is effected at the central portion 28 of the ferrule as indicated by the slight inward annular protuberance 44, and the ends of the ferrule blank 22 are formed even more tightly inwardly against the rung 20. However, because of the double noded effect wherein the column of the ferrule blank buckles outwardly on either side of the web, relatively little radial outward pressure is effected against the inner edge of the aperture 25 and the radial inward pressure is substantially reduced over that effected in the prior art invention referred to. Therefore, any tendency for the final forming process or the final step in the forming process to cause fracture of or deformation of the web of the rail or of the rung, such as might happen in fiberglass construction, is minimized.

Figure 10:
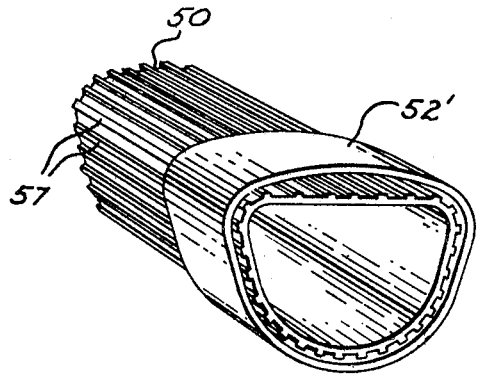
FIGURE 10 is a view similar to FIGURE 6 of another embodiment of the invention showing a D-shaped rung end portion and a D-shaped ferrule blank telescoped thereover.

Referring now to FIGURES 10–17 the second embodiment of the invention comprises a D-shaped rung 50 which is connected to a channel shaped side rail 51 by means of a ferrule 52 (FIGURE 16) formed from a ferrule blank 52' (FIGURE 10). The side rail 51 has a central web 53, laterally projecting flanges 54, and a suitable D-shaped aperture 55 (FIGURE 17) adapted to receive the end portion of the rung and said ferrule blank. The edge portion of the aperture 55 may be provided with outwardly projecting notches or pips 56 shown in broken lines. As in the first embodiment of the invention, the rung 50 may also be provided with longitudinally disposed, outwardly projecting ribs 57.

Figure 11:
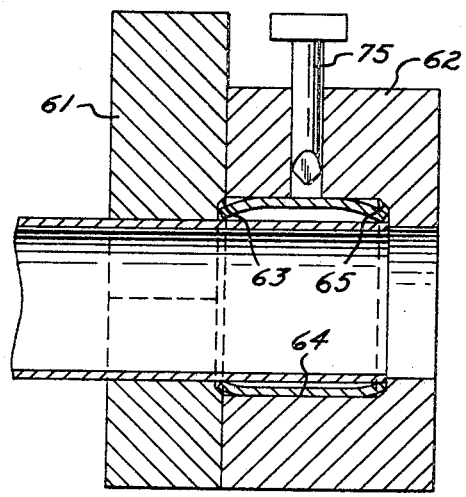
FIGURE 11 is a vertical section through the rung end portion of FIGURE 10 showing the ferrule blank being crimped onto the rung by a pair of dies.
Figure 12:
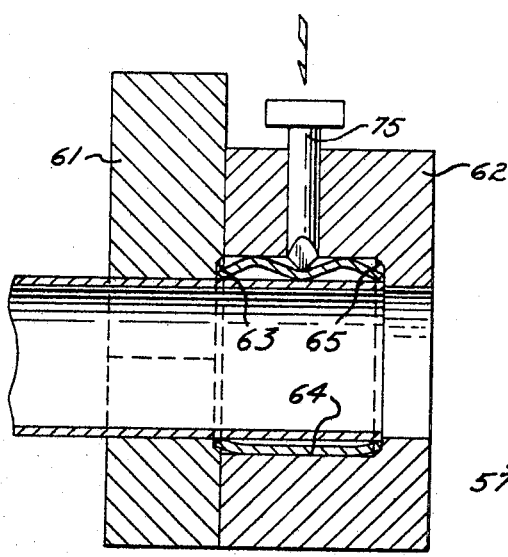
FIGURE 12 is a view similar to FIGURE 11 showing the manner in which the flattened side of the D-shaped ferrule blank is creased intermediate the ends of said blank.

As shown in FIGURE 11, the ferrule blank 52' is first crimped to the end portion of the rung 50 by a pair of die members 61 and 62. The crimping is done in the same manner as in the first embodiment, the die member 61 providing a beveled seat 63 and the die member 62 having a D-shaped cavity 64 and a beveled end seat 65. The die member 62 also carries a transversely disposed blade 75 which is adapted to be driven inwardly against the relatively flat portion of the D-shaped ferrule blank 52' in such manner as to provide a transverse crease 76 therein which is disposed half way between the ends of said ferrule blank. The crease 76 ensures that the D-shaped ferrule blank will buckle evenly on either side of the web 53 at the relatively flattened portion of said ferrule blank as well as the lower, rounded portion thereof.

Figure 13:
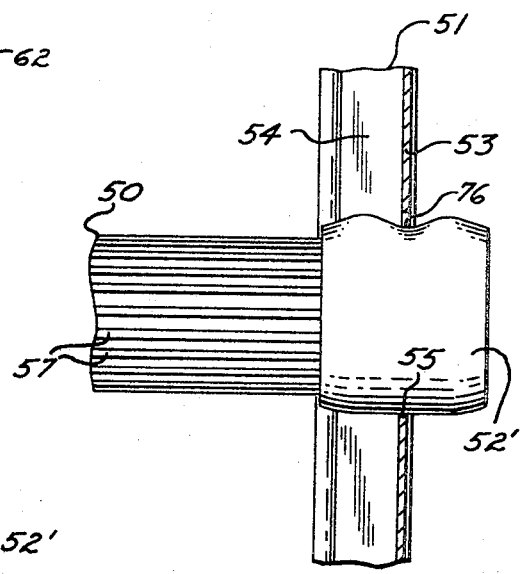
FIGURE 13 is a view similar to FIGURE 8 showing the D-shaped rung end portion with the ferrule crimped thereon positioned through an aperture in a side rail web.
Figure 14:
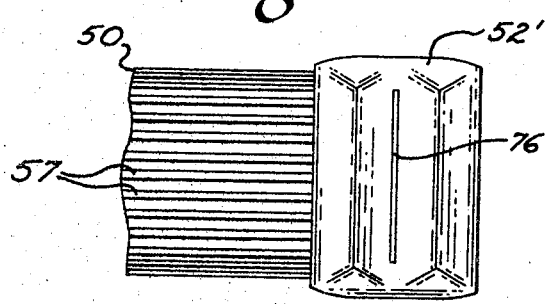
FIGURE 14 is a top plan view of the rung end portion and ferrule of FIGURE 13.
Figure 15:
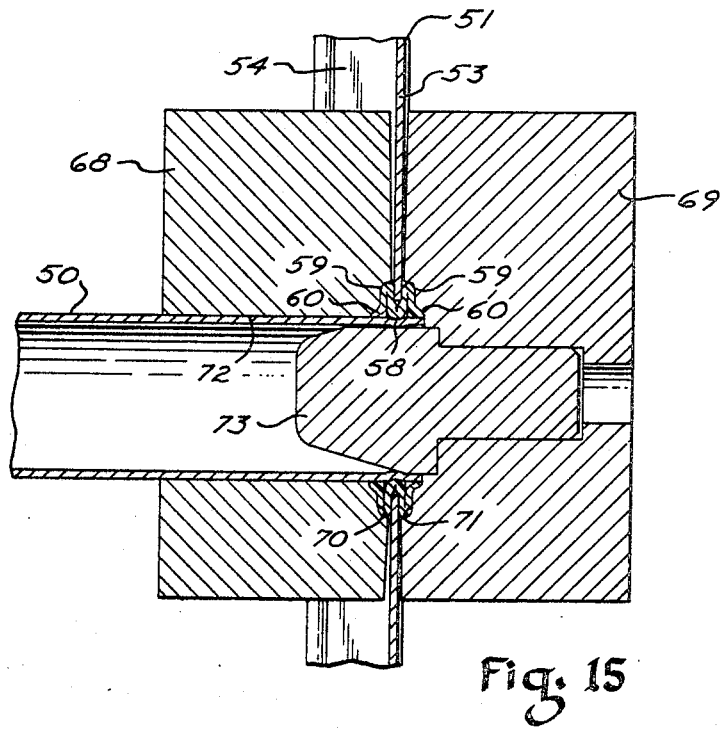
FIGURE 15 is a view similar to FIGURE 9 showing a pair of dies in closed position forming the D-shaped ferrule blank into its final shape for connecting the rung to the side rail.

FIGURE 13 shows the manner in which the end portion of the rung 50 with the creased ferrule blank crimped thereto is disposed through the aperture 55 with substantially equal portions of said ferrule blank projecting on either side of the web 53. The rung 50 is then engaged by a die member 68 having a suitable D-shaped cavity 70 and an opening 72 for receiving the rung. A second die member 69 having a D-shaped cavity 71 and a pilot member 73 is then closed with respect to the die member 68 whereby the ferrule 52 is formed out of the ferrule blank 52'. As in the first embodiment, the ferrule 52 has a central portion 58, which presses inwardly against the rung 50, and a pair of outwardly folded nodes 59 and axially projecting, inwardly crimped flanges 60.

Figure 2:
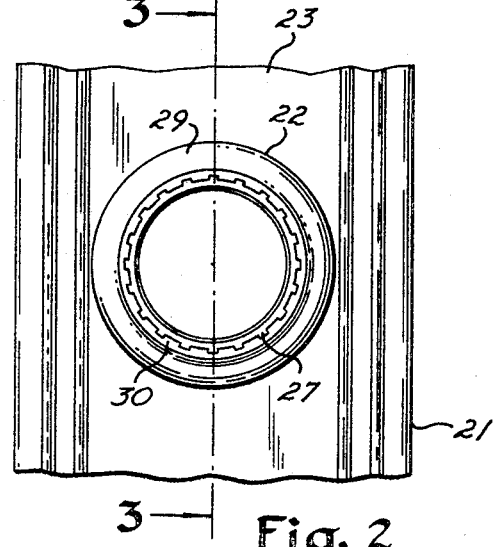
FIGURE 2 is an enlarged elevation of a portion of one ladder side rail as seen from one side of the ladder portion shown in FIGURE 1.
Figure 16:
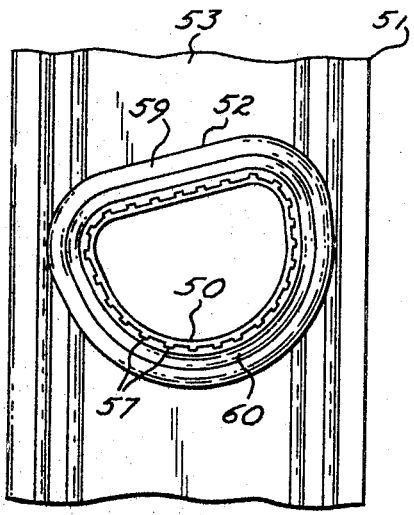
FIGURE 16 is a view similar to FIGURE 2 of the second embodiment of the invention.
Figure 17:
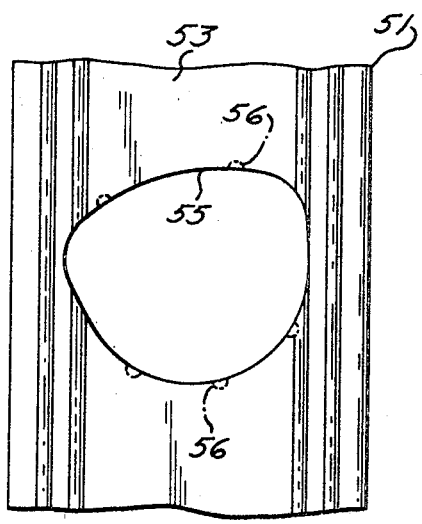
FIGURE 17 is a view similar to FIGURE 4 showing the shape of the aperture in the side rail web for use in the second embodiment of the invention.

Referring to FIGURES 2 and 16, it will be noted that the inwardly crimped and swaged ends of the ferrule 22 and 52 are flowed inwardly between the ribs 27 and 57 whereby the rungs 20 and 50 are firmly locked against rotation with respect to said ferrules. It will be further noted that where the notches or pips 26 or 56 are provided, the metal from the nodes 29 and 59 flow into said notches to firmly lock the ferrule with respect to the side rail. However, the present inventors have determined that when either round or D-shaped rungs are secured to side rails in the manner set forth herein, a substantially strong, torsion resistant connection is effected even without the use of ribs, notches, or the like to mechanically prevent relative rotation between either the rung and the ferrule or the ferrule and the side rail.

In both embodiments of the invention as herein disclosed, an improved rung to rail connection is provided having greater clamping pressure between the ferrule and the side rail, greater clamping area between said ferrule and said side rail, and lower radial pressure tending to fracture the side rail than in prior art structures with which the present inventors are familiar. Because the ferrule is initially a loose fit, it is unnecessary to chamfer either the end of the rung or the ferrule. The use of the double noded construction permits improved metal control with respect to positioning where the ferrule will collapse or buckle outwardly during the making of the joint. The present construction can be used in mounting a rung to a side rail of thin gage material, plastic, or fiberglass without damage to the side rail during application.

It will be understood that many changes in the details of the invention as herein described and illustrated may be made without, however, departing from the spirit thereof or the scope of the appended claims.

What is claimed is:

1. The method of joining an end portion of a ladder rung to a ladder side rail having a wall portion, the method comprising the steps of providing said wall portion with an opening therethrough substantially larger than the cross section of said rung; providing said end portion with an outer sleeve shaped ferrule blank of malleable material; inwardly deforming by creasing said blank into engagement with said end portion, projecting said end portion and blank through the opening; and compressing said blank axially whereby said blank is caused to buckle outwardly in two outwardly folded nodes disposed on either side of said web, said nodes being compressed tightly into engagement with portions of said web surrounding said opening.

2. The method of joining an end portion of a ladder rung to a ladder side rail having a wall portion, the method comprising the steps of providing said rung end portion with a loosely fitting, sleeve shaped, external ferrule blank; crimping the axially directed edge portions of said blank inwardly into engagement with said end portion; providing said wall portion with an opening slightly larger than and of the same general cross-sectional shape as said ferrule blank; projecting the end portion and ferrule blank through the opening; and collapsing said blank in an axial direction whereby said blank is caused to buckle outwardly into two outwardly folded nodes disposed on either side of said web, said nodes being compressed tightly into engagement with portions of said web surrounding said opening to provide a secure ladder rung joint.

3. The method of joining an end portion of a D-shaped ladder rung to a side rail having a wall portion, the method comprising the steps of providing said rung end portion with a loosely fitting, D-shaped, external ferrule blank having a generally flattened portion on its periphery; crimping the axially directed edge portions of said blank inwardly into engagement with said end portion; inwardly creasing said flattened portion of said blank intermediate the ends of said blank and transversely of the axis thereof; providing said wall portion with a generally D-shaped opening slightly larger than the outer transverse dimensions of said blank; projecting the end portion and blank through the opening whereby said crease is disposed in the plane of said opening; and collapsing said blank in an axial direction whereby said blank is caused to buckle outwardly into two outwardly folded nodes disposed on either side of said web, said nodes being compressed tightly into engagement with portions of said web surrounding said opening to provide a secure ladder rung joint.

References Cited

UNITED STATES PATENTS

| 2,667,688 | 2/1954 | Winter | 29—523 X |
| 3,012,800 | 12/1961 | Koch | 29—523 X |
| 3,039,186 | 6/1962 | Stoyer et al. | 29—520 |
| 3,168,938 | 2/1965 | Shaver | 182—228 |
| 3,140,540 | 7/1964 | Greenman | 29—523 X |

CHARLIE T. MOON, Primary Examiner

U.S. Cl. X.R.

29—520, 523; 182—228